United States Patent [19]

Miller

[11] 4,411,493
[45] Oct. 25, 1983

[54] SEASONAL CONTROL SKYLIGHT GLAZING PANEL WITH PASSIVE SOLAR ENERGY SWITCHING

[76] Inventor: Jack V. Miller, 700 N. Auburn Ave., Sierra Madre, Calif. 91024

[21] Appl. No.: 308,899

[22] Filed: Oct. 5, 1981

[51] Int. Cl.³ .................. G02B 17/00; G02B 27/00
[52] U.S. Cl. .................................. 350/262; 350/265
[58] Field of Search .......................... 350/259–265

[56] References Cited

U.S. PATENT DOCUMENTS

| | | | |
|---|---|---|---|
| 2,958,259 | 11/1960 | Ewing | 350/259 |
| 3,085,473 | 4/1963 | Bourgeaux et al. | 350/261 X |
| 3,255,665 | 6/1966 | Weiher et al. | 350/262 |
| 4,035,539 | 7/1977 | Luboshez | 350/259 X |
| 4,089,594 | 5/1978 | Ewin | 350/262 |
| 4,227,774 | 10/1980 | Corll | 350/263 |

*Primary Examiner*—Richard A. Wintercorn

[57] ABSTRACT

A substantially transparent one-piece glazing panel is provided for generally horizontal mounting in a skylight. The panel is comprised of an repeated pattern of two alternating and contiguous linear optical elements; a first optical element being an upstanding generally right-triangular linear prism, and the second optical element being an upward-facing plano-cylindrical lens in which the planar surface is reflectively opaque and is generally in the same plane as the base of the triangular prism.

5 Claims, 7 Drawing Figures

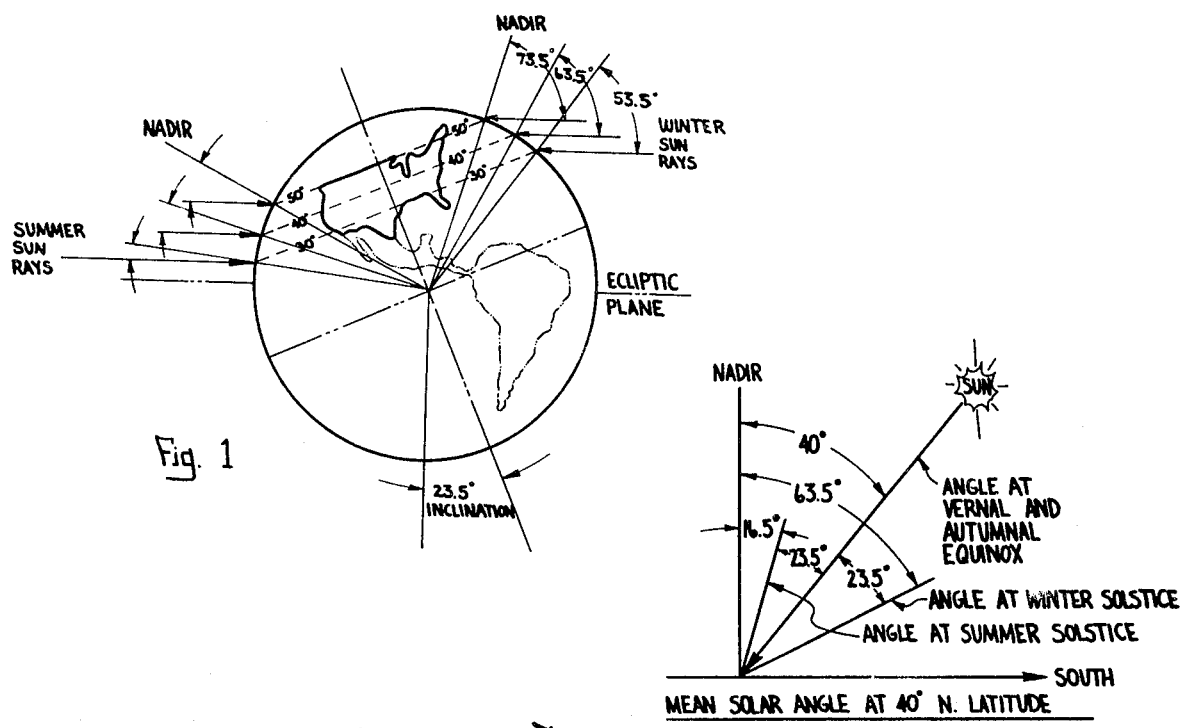
Fig. 1
Fig. 2
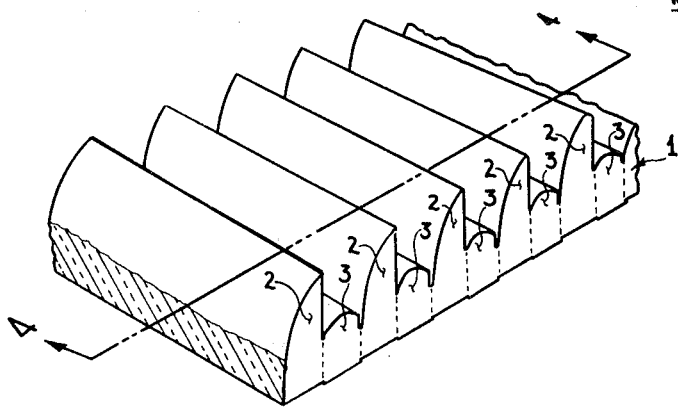
Fig. 3
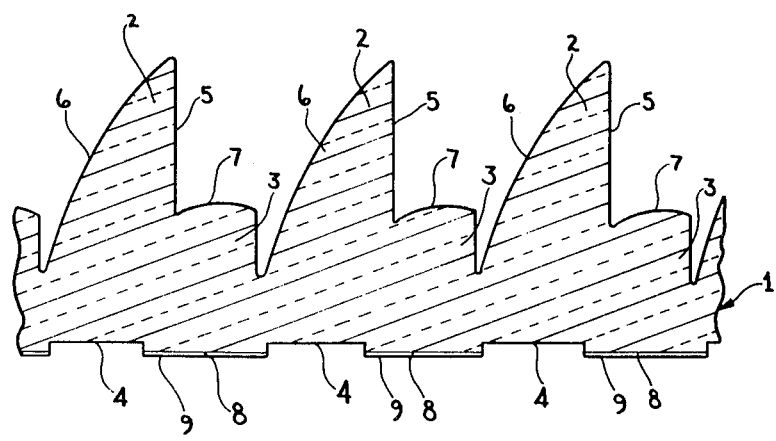
Fig. 4

SEASONAL CONTROL SKYLIGHT GLAZING PANEL WITH PASSIVE SOLAR ENERGY SWITCHING

BACKGROUND OF THE INVENTION

This invention relates to glazing panels for use as a primary or secondary glazing panel for building skylights, and more particularly to glazing panels that conserve energy used for heating, cooling and lighting buildings.

It is well known that skylights represent a significant solar heat input in the summer, and also represent a significant heat loss during the winter seasons. Common practice has been to orient sylight glazing panels at a nearly vertical angle facing north to exclude the summer sun while still admitting some illumination from skyglow, but being incapable of utilizing sunlight effectively for either heat or light. Another practice is to provide a secondary glazing panel as a thermal barrier of transparent material, which serves as a heat barrier to reduce losses through the skylight, but which also stops potential winter heat from entering the room.

The principal purpose of my invention is to provide a skylight glazing panel which is capable of accepting substantially all of the solar light and energy in the sunlight striking the skylight at solar angles near the winter solstice, and which is capable of excluding substantially all of the solar light and energy in the sunlight striking the same skylight at solar angles near the summer solstice, through the use of entirely passive optical elements.

SUMMARY OF THE INVENTION

I have invented a skylight glazing panel of the refractive and internally reflective type having unique optical properties, low manufacturing cost, and high performance efficiency for latitudes from 30° to 50° at which the solar angles for the winter solstice may be as great as 73.5° from nadir, and the solar angles for the summer solstice may be as small as 6.5° from nadir.

My invention comprises a generally horizontal panel which may be molded or extruded from any transparent material, such as glass or plastic, and which is comprised of an overall pattern of linear optical elements extending completely across the panel in one direction. A first optical element is an upstanding right-triangular prism and the second optical element is a plano-cylindrical lens. The base of the triangular prism and the planar surface of the lens form alternating strips which generally comprise the lower surface of the glazing panel. The two optical elements are alternately and contiguously arranged, and all optical surfaces are transparent except for the planar surface of the lens, which is made reflectively opaque.

The upstanding triangular prism is higher than the cylindrical lens and has its vertical plane facing towards the earth's equator, whereby the winter sun, at large angles from nadir, enters the vertical plane, reflects off the hypotenuse plane, and exits the base plane of the prism to contribute to the heat and light entering the room beneath the skylight. Conversely, the summer sun, at small angles from nadir, enters both planes of the triangular prism and also enters the convex cylindrical surface of the lens. The light entering the lens surface is focussed on the reflective strip of the planar portion of the lens, and is reflected back to the sky. The light entering the two planes of the triangular prism is substantially reflected internally between the two planes to also strikes the reflective planar portion of the lens, and is reflected back to the sky, with virtually no solar energy passing through the glazing panel into the room beneath the skylight.

In one preferred embodiment the switching from solar energy acceptance to solar energy reflectance is centered at the solar angle from nadir of 40°, which is at the vernal or autumnal equinox at the latitude of 40°. This automatically provides a passive solar control to substantially admit the sunlight during the period from the autumnal equinox to the vernal equinox, and substantially reject the sunlight during the period from the vernal equinox to the autumnal equinox, with maximum solar acceptance at the winter solstice.

BRIEF DESCRIPTION OF THE DRAWINGS

FIG. 1 is a diagram of the earth showing the principal solar angles typical of the latitudes in the United States;

FIG. 2 is an elevation view of the solar angles at the latitude of 40°;

FIG. 3 is a perspective view of the skylight panel according to the invention;

FIG. 4 is a cross-sectional view of a portion of the panel of FIG. 3, taken along line 4—4;

DETAILED DESCRIPTION OF THE DRAWINGS

Figure 5:
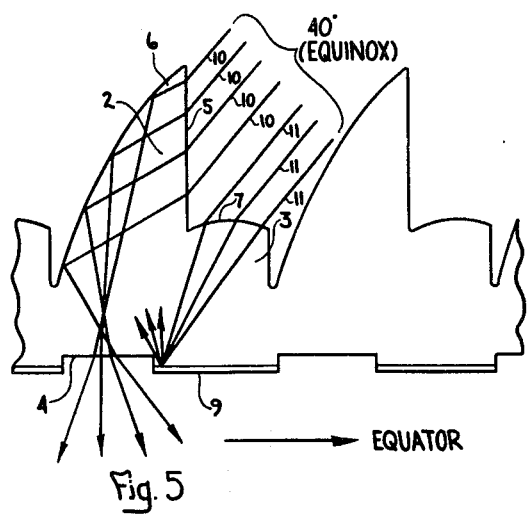
FIG. 5 is a cross-sectional view of a portion of the panel showing the solar ray paths at an incidence angle of 40° from nadir.

In FIG. 1 the earth is shown with its inclination angle of 23.5° from normal with the ecliptic plane. Angles from nadir to the solar angle at the winter solstice are shown as 53.5° at 30° lattitude 63.5° at 40° latitude, and 73.5° at 50° latitude. Also angles from nadir to the solar angle at the summer solstice are shown as 6.5° at 30° latitude, 16.5° at 40° latitude, and 26.5° at 50° latitude.

In FIG. 2 the total excursion of the noon sun is shown centered about the angle of the vernal and autumnal equinox angle of 40° at 40° north latitude. The excursions are 23.5°, the magnitude of the earth's inclination angle, to produce a highest sun angle of 16.5° in summer and 63.5° in winter, as measured from nadir. The ideal switching point for this latitude would then be 40°, with the skylight panel accepting solar light and energy from 40° to 63.5°, and rejecting by reflectance back to the sky the solar light and energy from 40° to 16.5°. In this manner the panel would permit sunlight to light and heat the room beneath a skylight with nearly all of the available sunlight from the autumnal equinox, through the winter months, to the vernal equinox; and reject the sunlight from the vernal equinox through the summer months to the autumnal equinox. In more southerly latitudes all of the angles of the sun would be higher, and with the 40° switching angle maintained, the summer solar rejection time would be extended, and the winter acceptance time would be shortened, which is ideal for the warmer overall temperatures at the lower latitude. Conversely, in more northerly latitudes, the angles are lower and the summer rejection time is shortened, and the winter acceptance time is extended, as would be appropriate for a generally colder climate.

In FIG. 3 a skylight glazing panel 1 according to the invention is shown being comprised of a repeated pattern of upstanding linear right-triangle prisms 2 and contiguous, upward-facing plano-cylindrical linear lenses 3, formed of a single unitary structure of a transparent material, such as glass or plastic.

In FIG. 4 a cross-sectional view of the panel is shown in which each prism 2 has a base 4, a vertical face 5, and a hypotenuse 6, which may be flat or slightly curved as shown. Each linear lens 3 has a cylindrical portion 7 facing upwards, and a planar portion 8 generally in the plane of the base 4 of prisms 2. Planar portion 8 is shown slightly raised from base 4 for manufacturing reasons, as a reflective surface 9 my be applied with simple roller application.

In FIG. 5 solar rays 10 and 11 may be seen impinging the optical elements at an angle of 40° from nadir, which is the equinox angle at 40° latitude. Rays 10 pass into prism 2 through the vertical face 5, reflect from the hypotenuse 6 and exit from the base 4. Rays 11 enter cylindrical face 7 of lens 3 to impinge reflective surface 9 and be reflected back towards the sky.

Figure 6:
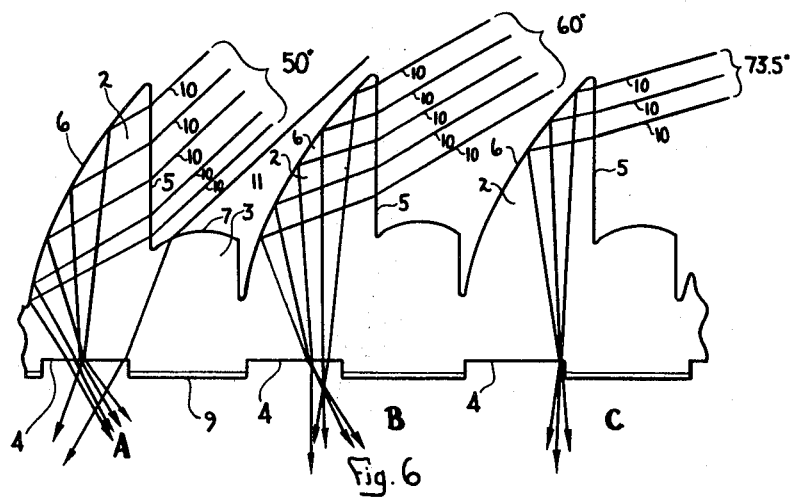
FIG. 6 is a cross-sectional view of a portion of the panel ahowing solar ray paths at indicence angles greater than 40° from nadir.

In FIG. 6 it may be seen that with increasing solar angle from nadir to 50° as shown in section A that all of the incident solar rays 10 pass through vertical face 5 of prism 2, reflect from hypotenuse 6 and exit the base 4. Those rays 11 which are not shielded by the adjacent prism 2 pass through cylindrical face 7 of lens 3 to also pass through base 4 as useful energy. As the solar angle is further increased to 60°, as would happen with the approach of winter, all rays have been shielded from striking lens 3, so all available rays 10 pass through vertical face 5 of prism 2, reflect from hypotenuse 6 and exit from base 4 as shown in section B. In section C the solar angle is further increased to 73.5°, the lowest noon sun in the winter at 40° latitude, whereby all of the available rays enter vertical face 5 of prism 2 to reflect from hypotenuse 6 and exit from base 4 as useful energy.

Figure 7:
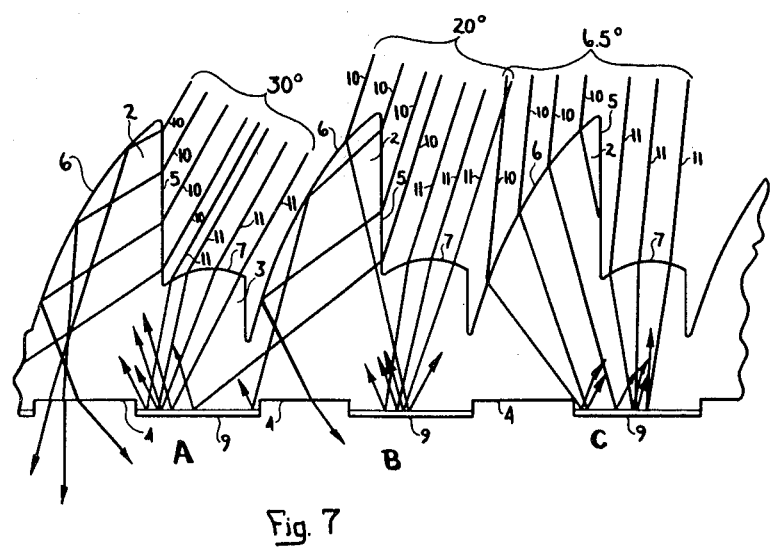
FIG. 7 is a cross-sectional view of a portion of the panel showing the solar ray paths at incidence angles smaller than 40° from nadir.

In FIG. 7 it may be seen that with decreasing solar angle from nadir to 30° as shown in section A, that the projected area, and hence the incident light in rays 10 incident to vertical face 5 of prism is also decreased. As a result fewer rays exit from base 4. Concurrently the projected area of surface 7 of lens 3 is increased, and a greater portion of the incident light impinges reflective face 9 and is reflected back towards the sky. As a result, fewer rays enter the room at the incident anlge of 30° than at the 40° angle shown in FIG. 5. In section B a further elevation of the solar rays to 20° from nadir diverts more rays from the transparent base 4 to the reflective face 9, further reducing solar energy entering the room. In section C elevation of the solar rays to the closest angle to nadir of 6.5°, which is the noon sun angle at the summer solstice at 40° latitude, nearly all incident rays are diverted from the transparent base 4 to the reflective face 9, reducing soler anergy entering the room to a negligible amount.

I claim:

1. A substantially transparent one piece glazing panel for generally horizontal mounting in a skylight and comprising a repeated pattern of two alternating and contiguous linear optical elements; a first optical element being an upstanding generally right-triangular linear prism, and a second optical element being an upward-facing plano-cylindrical lens in which the planar surface is reflectively opaque and is generally in the same plane as the base of the right-triangular prism.

2. A skylight glazing panel according to claim 1 in which the hypotenuse face of the right-triangular linear prism is at least partially a convex surface.

3. A skylight glazing panel according to claim 1 in which the planar portion of the plano-convex lens and the base of the right-triangular linear prism are co-planar, and the planar surface of the lens is offset a sufficient distance from the base of the prism to permit application of a reflective coating to the lens surface only with a roller coating process.

4. A skylight glazing panel according to claim 1 in which the height of the upstanding linear prism is sufficient to shield the adjacent plano-convex lens from rays from an angle from nadir of at least 45°.

5. A skylight glazing panel according to claim 1 in which the vertical faces of the upstanding right-triangular prisms are oriented generally towards the earth's equator.

* * * * *